(12) United States Patent
Yeoum et al.

(10) Patent No.: US 9,185,545 B2
(45) Date of Patent: Nov. 10, 2015

(54) LOCAL BREAKOUT SESSION ESTABLISHMENT METHOD AND APPARATUS IN WIRELESS COMMUNICATION SYSTEM

(75) Inventors: Tae Sun Yeoum, Seoul (KR); Chae Gwon Lim, Seoul (KR); Sung Ho Choi, Suwon-si (KR); Eun Hui Bae, Seoul (KR)

(73) Assignee: Samsung Electronics Co., Ltd (KR)

(*) Notice: Subject to any disclaimer, the term of this patent is extended or adjusted under 35 U.S.C. 154(b) by 1023 days.

(21) Appl. No.: 13/131,169

(22) PCT Filed: Nov. 24, 2009

(86) PCT No.: PCT/KR2009/006921
§ 371 (c)(1),
(2), (4) Date: Aug. 12, 2011

(87) PCT Pub. No.: WO2010/062093
PCT Pub. Date: Jun. 3, 2010

(65) Prior Publication Data
US 2011/0292896 A1 Dec. 1, 2011

(30) Foreign Application Priority Data
Nov. 25, 2008 (KR) ........................ 10-2008-0117632

(51) Int. Cl.
*H04W 8/08* (2009.01)
*H04W 36/08* (2009.01)
(Continued)

(52) U.S. Cl.
CPC ........... *H04W 8/082* (2013.01); *H04L 2212/00* (2013.01); *H04W 36/08* (2013.01); *H04W 76/02* (2013.01); *H04W 80/04* (2013.01); *H04W 84/045* (2013.01)

(58) Field of Classification Search
None
See application file for complete search history.

(56) References Cited

U.S. PATENT DOCUMENTS 8,254,294 B2 * 8/2012 Vesterinen .................. 370/259
8,446,863 B2 * 5/2013 Parsons et al. ............. 370/328
(Continued)

FOREIGN PATENT DOCUMENTS

| WO | WO 2008/114823 | 9/2008 |
| WO | WO 2008131239 | 10/2008 |
| WO | WO 2009/114643 | 9/2009 |

OTHER PUBLICATIONS

ZTE, Attach procedure, Jun. 2007, 3GPP TSG SA WG2, pp. 1-4.*
PCT/ISA/237 Written Opinion issued on PCT/KR2009/006921 (3 pp.).
PCT/ISA/210 Search Report issued on PCT/KR2009/006921 (3 pp.).
Nguyen-Vuong, et al., An Architecture for UMTS-WIMAX Interworking, Proceedings of the 1st International Workshop on BCN, pp. 1-10, 2006.
(Continued)

*Primary Examiner* — Hicham Foud
(74) *Attorney, Agent, or Firm* — The Farrell Law Firm, P.C.

(57) ABSTRACT

A local breakout session establishment method and apparatus in an Evolved Packet System (EPS) is provided for an HeNB to efficiently route local IP packets. A local breakout service method for a wireless communication system including a macro evolved Node B (eNB) and a Home eNB (HeNB) having a Packet Data Network (PDN) gateway (PGW) and a serving gateway (SGW) includes selecting, at a Mobility Management Entity (MME), the PGW of the HeNB and transmitting a Create Default Bearer Request message to the HeNB in response to a local breakout service request message including a local breakout Access Point Name (APN); assigning, at the HeNB, an IP address to a user equipment transmitted the local breakout service request message and transmitting a Create Default Bearer Response message including a Tunnel Endpoint Identifier (TEID) to the MME; transmitting a Bearer Setup Request message including the TEID from the MME to the HeNB; and configuring, at the HeNB, a radio bearer with the user equipment and routing data transmitted by the user equipment through the radio bearer to an Internet Protocol (IP) network by means of the internal PGW.

28 Claims, 5 Drawing Sheets

(51) Int. Cl.
*H04W 76/02* (2009.01)
*H04W 80/04* (2009.01)
*H04W 84/04* (2009.01)

(56) References Cited

U.S. PATENT DOCUMENTS

| | | | |
|---|---|---|---|
| 2009/0232019 A1* | 9/2009 | Gupta et al. | 370/252 |
| 2010/0008234 A1* | 1/2010 | Ulupinar et al. | 370/241 |
| 2010/0046418 A1* | 2/2010 | Horn et al. | 370/315 |
| 2011/0134863 A1* | 6/2011 | Zisimopoulous et al. | 370/329 |
| 2011/0158171 A1* | 6/2011 | Centonza et al. | 370/328 |
| 2011/0199987 A1* | 8/2011 | Rommer et al. | 370/329 |
| 2013/0107702 A1* | 5/2013 | Gupta et al. | 370/230 |
| 2013/0235801 A1* | 9/2013 | Parsons et al. | 370/328 |

OTHER PUBLICATIONS

Zhao, et al., Flexible Network Support for Mobile Hosts, Mobile Networks and Applications vol. 6, pp. 137-149, 2001.

Nortel, "LTE Local Breakout for Home eNB", R3-083198, 3GPP TSG-RAN WG3 Meeting #62, Nov. 10-14, 2008.

3rd Generation Partnership Project; Technical Specification Group Services and System Aspects; General Packet Radio Service (GPRS) Enhancements for Evolved Universal Terrestrial Radio Access Network (E-UTRAN) Access (Release 8), 3GPP TS 23.401 V8.3.0, Sep. 2008.

3rd Generation Partnership Project; Technical Specification Group Radio Access Network; Home (e) NodeB; Network Aspects (Release 8), 3GPP TR R3.020 V0.9.1, Nov. 2008.

* cited by examiner

LOCAL BREAKOUT SESSION ESTABLISHMENT METHOD AND APPARATUS IN WIRELESS COMMUNICATION SYSTEM

TECHNICAL FIELD

The present invention relates to a wireless communication system supporting Internet Protocol (IP) packet data service and, in particular, to a local breakout session establishment method and apparatus in an Evolved Packet System (EPS).

BACKGROUND ART

Recent cellular systems provide packet data services, as well as basic voice communication service, through the interoperability with packet-switched data networks. Typically in the wireless communication system such as Wideband Code Division Multiple Access (WCDMA) system supporting data services, the data services are provided through the service provider's network such that the data traffics are concentrated to the service provider's network.

In case of a WCDMA system providing the subscribers with internet access service, the packet data transmitted by a User Equipment are delivered to an IP router through a Node B, a Radio Network Controller (RNC), a Serving GPRS Support Node (SGSN), and a Gateway GPRS Support Node (GGSN). In this case, since the user data are routed through a tunnel established between the RNC to the GGSN using a GPRS Tunneling Protocol (GTP) which operates unlike the typical IP routing protocols, IP routers placed on the link between the RNC and GGSN do not know the content of the data. This means that the packet data transmitted by the user must pass across the GGSN, i.e. the operator s IP router regardless of the location of the Internet server which the user wants to access. However, this IP packet routing method is very inefficient as compared to the normal IP routing method. In such a network structure, the concentration of the traffic load to the network increases significantly as the packet data traffic increases.

A home networking service can be another example as a packet data service provided through a cellular network. In Long Term Evolution (LTE) as an evolved 3GPP mobile communication technology, a Home evolved Node B (HeNB) is defined as a femto cell to support LTE air interface, and researches are being conducted to control electric appliances and play audio and video data remotely using a User Equipment (UE) connected to the HeNB. Here, the HeNB can be defined as a femto base station similar to a DSL router and a cable modem to provide cellular coverage in a subscriber's home or small business and provides cellular coverage very small as compared to a macro Node B (macro NB). In the current LTE network architecture, however, the data transmitted to the HeNB must be delivered across the operator's network such that even the local traffic leaves the current region and then back into the home network unreasonably.

As aforementioned, the conventional mobile communication systems supporting IP-based data services deliver even the local traffic through the operator's network, and thus the local traffic delivered through inefficient routing paths increases traffic load unnecessarily from the viewpoint of the operator's network and causes transmission latency from the viewpoint of the home networking service.

Recently, the use of the packet data services of the mobile communication system tends to increase rapidly in various fields, whereby an efficient local traffic handling mechanism is becoming one of the significant issues to be addressed in the cellular communication supporting packet data service.

Figure 1:
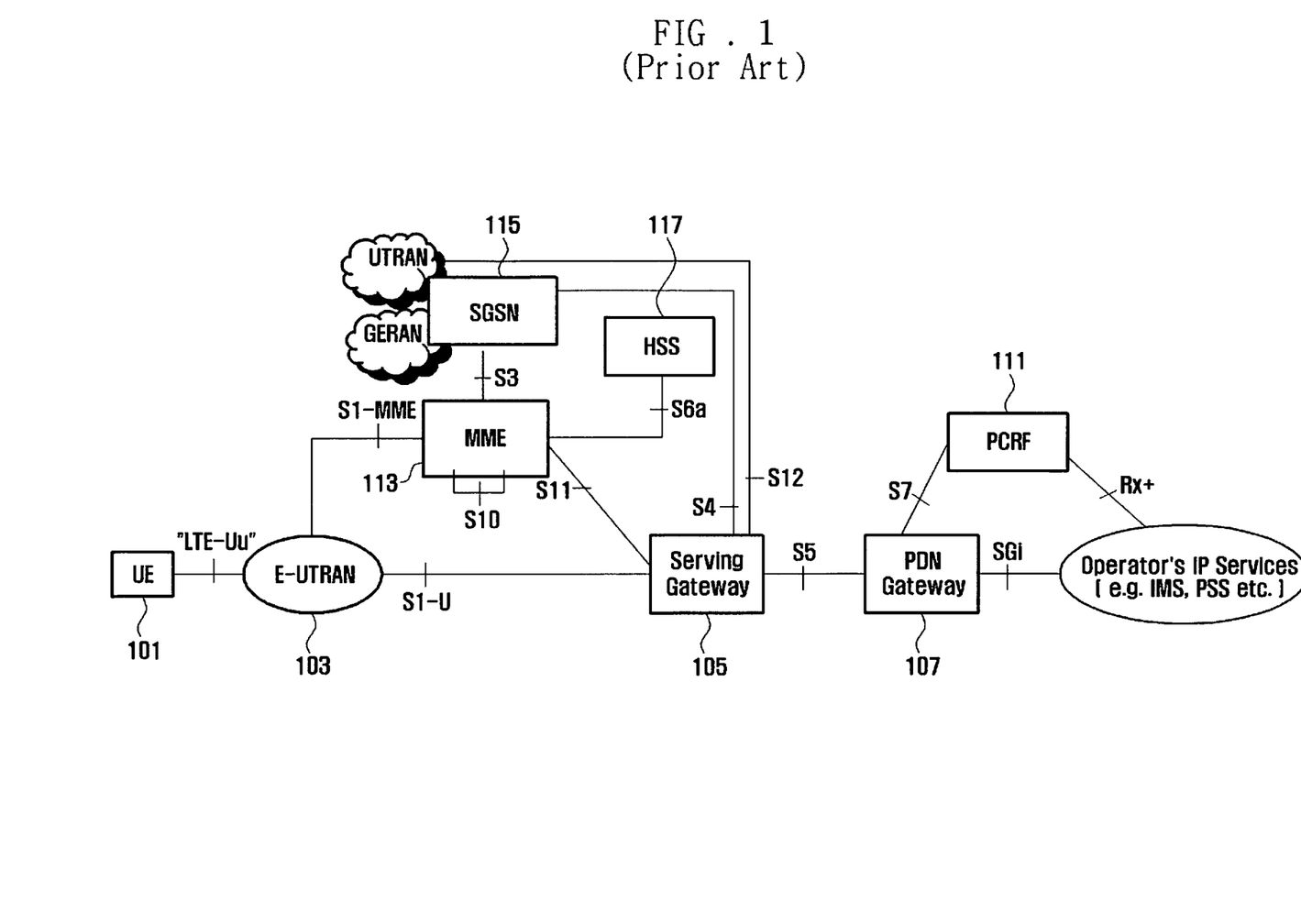
FIG. 1 is a diagram illustrating Evolved Packet System (EPS) architecture for 3GPP access.

FIG. 1 is a diagram illustrating an Evolved Packet System (EPS) architecture for 3GPP access. EPS is a packet-optimized system evolved from the Universal Mobile Terrestrial System (UMTS). The EPS is also termed System Architecture Evolutions and the terms are interchangeable used. The SAE system includes an Evolved-UMTS Terrestrial Radio Access Network (E-UTRAN) 103, a Mobility Management Entity (MME) 113, a Serving Gateway (S-GW) 105, a Policy Control and Charging Rules function (PCRF), and a Packet or Public Data Network (PDN) Gateway (PGW) 107.

The E-UTRAN 103 is an evolved access network and includes an evolved Node B (eNB). The MME 113 is responsible for terminating Non Access Stratum (NAS) signaling, NAS signaling security, UE mobility management, idle mode UE management, roaming, authentication, and bearer management. The SGW 105 is responsible for local mobility anchor function for inter-eNB handover, inter-Radio Access Technology (RAT) anchor function, idle mode downlink packet buffering function, and lawful interception (LI). Here, the LI means eavesdropping of IP with lawful authorization. The PGW 107 is responsible for policy enforcement, per-user based packet filtering, charging support, LI, UE IP address allocation, and packet screening function.

The PCRF 111 is responsible for management of service-specific policy control and Quality of Service (QoS). The SGSN 115 is an entity of the legacy packet network and responsible for controlling services related to the UEs. For instance, the SGSN 115 is responsible for manages the billing data per UE and provides the UE with the service-specific data. The HSS 117 is responsible for managing the subscriber information and location information.

The above-described network entities can support additional functions depending on the supportable services.

Assuming that the server within an IP network which the UE wants to access is located near the current location of the UE, e.g. the server is placed in the network where the eNB is, the data packet generated by the UE is transmitted to the PGW outside the network and then delivered to the server within the network of the eNB according to the normal IP routing method.

Figure 2:
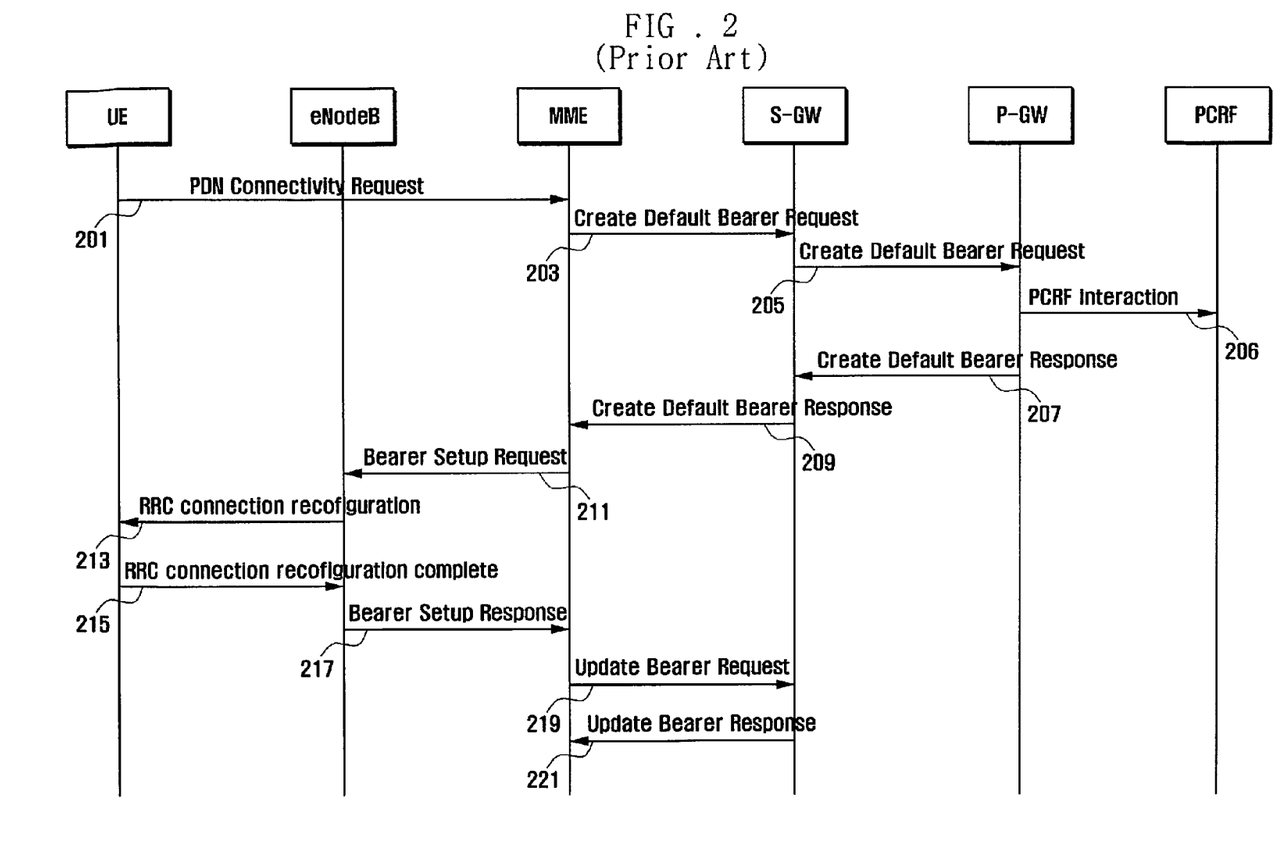
FIG. 2 is a sequence diagram illustrating operations of entities when a UE requests the network for an additional IP address in the conventional wireless communication system.

FIG. 2 is a sequence diagram illustrating operations of entities when a UE requests the network for an additional IP address in the conventional wireless communication system.

Referring to FIG. 2, first the UE 101 sends the MME 113 a PDN Connectivity Request message including an Access Point Name (APN) designated for the network to access (201). Upon receipt of the PDN Connectivity Request message, the MME 113 verifies the APN with the subscription information and selects, if the APN is verified, a PGW 107 indicated by the APN for providing PDN service. Once the PGW 107 is selected, the MME 113 sends a Create Default Bearer Request message including the address of the PGW 107 to the SGW 105 (203). The SGW 105 forwards the Create Default Bearer Request message to the PGW 107 (205). If the Create Default Bearer Request message is received, the PGW 107 performs a PCRF interaction with the PCRF 111 for acquiring the policy and charging control (PCC) rule for the UE 101 (206).

After the completion of the PCRF interaction, the PGW 107 assigns an IP address to the UE 101 and sends a Create Default Bearer Response message including the UE IP address to the SGW 105 (207). The SGW 105 forwards the Create Default Bearer Response message to the MME 113 (209). The SGW related information includes the IP address of the SGW 105 and Tunnel Endpoint Identifiers (TEIDs) of the control and user planes. Upon receipt of the Create Default Bearer Response message, the MME 113 sends a PDN Connectivity Accept message including the IP address assigned by the PGW 107 to the UE 101 in response to the PDN Connectivity Request message transmitted by the UE 101 at step 201. In more detail, the MME 113 sends a Bearer Setup Request message including the PDN Connectivity Accept message to the eNB 102 (211), and the eNB 102 sends a Radio Resource Control (RRC) Connection Reconfiguration message including the PDN Connectivity Accept message to the UE 101 (213).

Upon receipt of the RRC Connection Reconfiguration message, i.e. the PDN Connectivity Accept message, the UE 101 sends an RRC Connection Reconfiguration Complete message to the eNB 102 (215). The eNB 102 received the RRC Reconfiguration Complete message sends a Bearer Setup Response message to the MME 113 (217). The MME received the RRC Reconfiguration Complete message sends an Update Bearer Request message including the IP address of the eNB 102 and the user plane TEID to the SGW 105 (219), and the SGW 105 sends an Update Bearer Response message to the MME 113. As a consequence a GTP tunnel is established between the eNB 102 and the SGW 105 for tunneling the data packets.

According to the procedure described with reference to FIG. 2, the GTP tunnel is established between the eNB 102 and the PGW 107 such that the data transmitted by the UE delivered to the IP network through the eNB 102, SGW 105, and the PGW 107 and the data received from the IP network is delivered to the UE 101 in reverse order.

In the cellular system using this conventional packet transmission method, however, all the packet data transmitted by the UE are delivered to the server via the PGW 107 regardless of the location of the server, whereby the local data packets destined to the server locates near the eNB experience unnecessary propagation delay.

DISCLOSURE OF INVENTION

Technical Problem

In order to overcome the above problems of the prior art, the present invention provides a local breakout session establishment method and apparatus for an EPS system supporting packet data service that is capable of efficiently routing the IP packets by differentiating the local data traffic for a home network from general data traffic, resulting in reduction of propagation delay of the local traffic and traffic load of operator's network.

Also, the present invention provides a local breakout session establishment method and apparatus that is capable of minimizing traffic load of the network by assigning IP address to the UE in consideration of the service requested by the UE and using a more enhanced HeNB having the functions of the PGW and SGW.

Solution to Problem

In accordance with an exemplary embodiment of the present invention, a local breakout service method for a wireless communication system including a macro evolved Node B (eNB) and a Home eNB (HeNB) having a Packet Data Network (PDN) gateway (PGW) and a serving gateway (SGW) includes selecting, at a Mobility Management Entity (MME), the PGW of the HeNB and transmitting a Create Default Bearer Request message to the HeNB in response to a local breakout service request message including a local breakout Access Point Name (APN); assigning, at the HeNB, an IP address to a user equipment transmitted the local breakout service request message and transmitting a Create Default Bearer Response message including a Tunnel Endpoint Identifier (TEID) to the MME; transmitting a Bearer Setup Request message including the TEID from the MME to the HeNB; and configuring, at the HeNB, a radio bearer with the user equipment and routing data transmitted by the user equipment through the radio bearer to an Internet Protocol (IP) network by means of the PGW of the HeNB.

Preferably, selecting the internal PGW of the HeNB includes selecting an address of the HeNB transmitted by a Home Subscriber Server (HSS) as the PGW address. Preferably, the local breakout service method further includes transmitting, when an Attach Request message is received from the user equipment, the Attach Request message including a local breakout indicator from the HeNB to the MME; transmitting a Location Update message including the address of the HeNB from the MME to the HSS; and storing, at the HSS, the address of the HeNB in a user equipment context for use in local breakout service as a gateway address and registering a location update of the user equipment.

Preferably, the local breakout service request message is a PDN Connectivity Request message or an Attach Request message including the local breakout APN, the local breakout APN has a fixed value for all user equipments and predefined between the user equipment and network, and the local breakout APN is formatted in forms of local, local.<mnc>.<mcc>, and <home eNB id>.<mnc>.<nnc>, or by inserting a home local breakout flag into the PDN request message, to support HeNB local breakout.

In accordance with another exemplary embodiment of the present invention, a local breakout service apparatus for a wireless communication system includes a user equipment which transmits a local breakout service request message including a local breakout Access Point Name (APN); a home evolved Node B (HeNB) which includes a Packet Data Network (PDN) Gateway (PGW) and a Serving Gateway (SGW), assigns an IP address to the user equipment when receiving a Create Default Bearer Request message, transmits a Create Default Bearer Response message including a Tunnel Endpoint Identifier (TEID) in response to the Create Default Bearer Request message, configures a radio bearer with the user equipment when a Bearer Setup Request message is received, and routes data received through the radio bearer by means of the PGW; and a Mobility Management Entity (MME) which selects an address of the PGW of the HeNB when the local breakout service request message is received, transmits the Create Default Bearer Request message to the HeNB, and transmits the Bearer Setup Request message including the TEID to the HeNB.

Preferably, the local breakout service apparatus further includes a Home Subscriber Server (HSS) which stores the address of the PGW of the HeNB in a user equipment context for use in local breakout service and registers location update of the user equipment.

In accordance with still another exemplary embodiment of the present invention, a local breakout service method for a wireless communication system including a home evolved Node B (HeNB) having a Packet Data Network (PDN) gateway (PGW) and a serving gateway (SGW) includes receiving Access Point Name (APN); selecting, when the APN is a local breakout APN, the HeNB as a PGW for the local breakout service; selecting, when APN is received from the HeNB, the HeNB as a SGW for the local breakout service; requesting the HeNB for creating default bearer; and routing, at the HeNB, data transmitted by a user equipment to an Internet Protocol (IP) network.

Advantageous Effects of Invention

In the local breakout session establishment method and apparatus for an LTE system according to the present invention, the IP address of the UE assigned by different network entities depending on the characteristics of the service requested by the UE, thereby reducing unnecessary signaling traffic. That is, the local breakout session establishment method and apparatus of the present invention allows the HeNB to assign the IP address to the UE requesting a local data service, thereby preventing the signaling for local data service session from being transmitted to the PGW unnecessarily.

BRIEF DESCRIPTION OF DRAWINGS

The above and other objects, features and advantages of the present invention will be more apparent from the following detailed description in conjunction with the accompanying drawings, in which.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

In the following description, the local breakout session establishment method and apparatus method and apparatus of the present invention is directed to the LTE system supporting the local breakout in which the HeNB differentiates the local data packets from the general data packets such that the local data packets do not need to leave the network under the control of the HeNB. The present invention also includes a method in which the UE requests an IP address for a local breakout service directly.

The present invention proposes a method for differentiating a local IP address for use in a network under the control of a HeNB from a general IP address for use across the operator's network. For this purpose, the system determines whether the service requested by the UE is a general packet service which requires delivery of the data packet across the operator s network or a local packet service which does not require delivery of the data packet across the operator's network and assigns an IP address depending on the determined service.

In an exemplary embodiment of the present invention, the HeNB of the LTE system can support the local breakout service such that the UE can transmit the data to the IP network directly via the HeNB without passing through the operator's network. In this case, the UE can request the IP address for the local breakout service.

Figure 3:
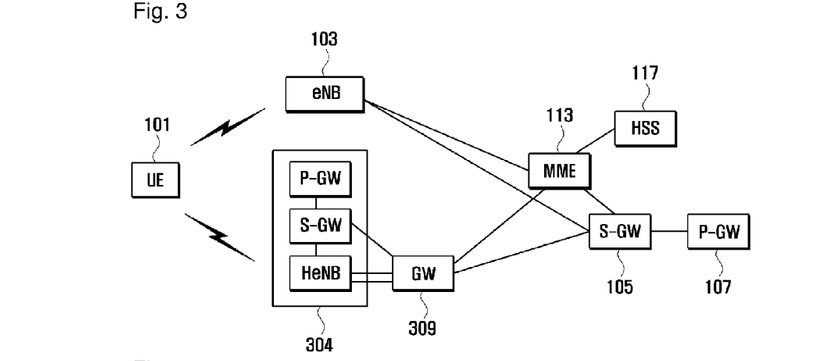
FIG. 3 is a diagram illustrating an EPS architecture including a HeNB for supporting a local breakout session establishment method according to an exemplary embodiment of the present invention.

FIG. 3 is a diagram illustrating an EPS architecture including a HeNB for supporting a local breakout session establishment method according to an exemplary embodiment of the present invention.

In FIG. 2, the UE 101 is a mobile station, and the eNB 103 is a base station. The MME 113 is responsible for NAS signaling, signaling security, UE mobility management, idle mode UE location, roaming, authentication, and bearer management. The SGW 105 is responsible for local mobility anchor function for inter-eNB handover, inter-Radio Access Technology (RAT) anchor function, idle mode downlink packet buffering function, lawful interception (LI), and packet routing and forwarding function. Here, the LI means eavesdropping of IP with lawful authorization. The PGW 107 is responsible for policy enforcement, per-user based packet filtering, charging support, LI, UE IP address allocation, and packet screening function. The HSS 117 is responsible for managing the subscriber information and location information.

The HeNB 304, as a femto base station providing cellular coverage in a subscriber's home or a small business, is identical with the macro eNB (eNB 103 in FIG. 3) in functionality and supports user access control using a whitelist. The HeNB 304 can support the functions of the PGW and SGW including IP address assignment function and IP routing function for routing the data packet within the local network without delivery to the SGW 105. This function for routing the data packet within the local network under the control of a HeNB without transmitting to the SGW 105 and PGW 107 is call local breakout function. The gateway 309 is responsible for bridging the HeNB and SGW.

The local breakout service request message can be a PDN Connectivity Request message or an Attach Request message. That is, the UE 101 can transmit the local breakout APN by means of the PDN Connectivity Request message or the Attach Request message to request a local breakout service.

Figure 4:
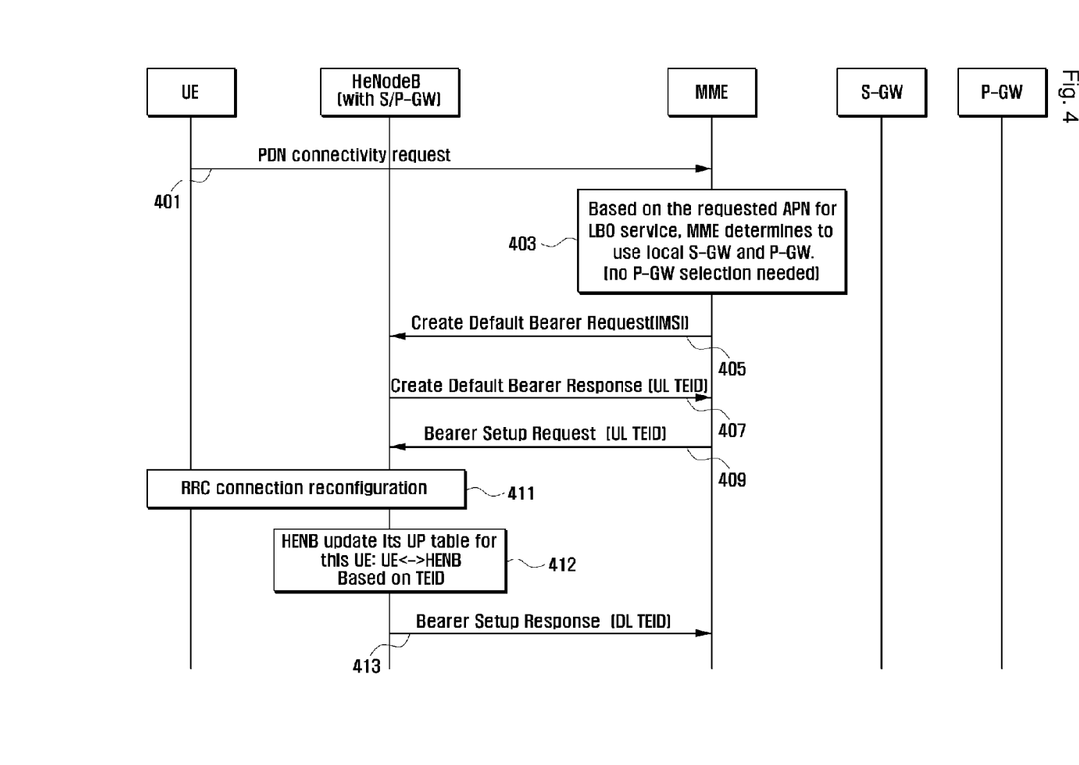
FIG. 4 is a sequence diagram illustrating operations of network entities for local breakout session establishment method when an UE requests for a local breakout service in an LTE system according to an exemplary embodiment of the present invention.

FIG. 4 is a sequence diagram illustrating operations of network entities for local breakout session establishment method when an UE requests for a local breakout service in an LTE system according to an exemplary embodiment of the present invention.

Referring to FIG. 4, the UE 301 sends a PDN Connectivity Request message including an APN to the MME 113 via an eNB 103 or a HeNB 304 in order to request for a local IP address for use in the network under the control of the HeNB 304 (401). Upon receipt of the PDN Connectivity Request message, the MME 113 determines whether the UE wants the local breakout service based on the APN contained in the PDN Connectivity Request message (405). The APN indicative of the local breakout service is called as local breakout APN. The local breakout APN is same for all the users and predefined between the UE 301 and the network. The MME 13 feeds backs the same local breakout AP to the HeNB 304 requested for the local breakout service, all the HeNBs use the same APN value. The local breakout APN can indicated by an information element such as local, local.<mnc>.<mcc>, <home eNB id>.<mnc>.<ncc>, or a home local breakout flag contained in the PDN Connectivity Request message along with a normal APN, or other type of HeNB local breakout indicator.

When the UE 101 requests for the local breakout service by transmitting the Attach Request message or the PDN Connectivity Request message containing the local breakout APN, the MME 113 selects the address of the HeNB provided by the HSS 117 rather than performing a normal PGW selection process (403). In case that the UE 101 is connected to the HeNB 304 (i.e. the Attach Request message or the PDN Connectivity Request message is received via the HeNB 304), the MME 113 determines that the request is for the local breakout service and thus sends a Create Default Bearer Request including the International Mobile Subscriber Identity (IMSI) to the HeNB 304 (other than SGW 105). Whereas, in case that the Attach Request message or the PDN Connectivity Request message is received via an eNB 103 (i.e. macro eNB), the MME 113 determines that the request is for a normal network service (403) and sends the Create Default Bearer Request including the International Mobile Subscriber Identity (IMSI) to the SGW 105.

When the UE 101 request for the PDN connection with the local breakout APN, it is possible for the UE 101 to connect the home network via either the eNB 103 (macro eNB) or the HeNB 204.

Once it is determined that the UE 101 request for the local breakout service at step 403, the MME 113 sends the Create Default Bearer Request message including the IMSI to the HeNB 304 (405). Upon receipt of the Create Default Bearer Request message, the HeNB 304 assigns an IP address to the UE directly and creates a UE context about the UE 101. Next, the HeNB 304 sends a Create Default Bearer Response message including an UL TEID to the MME 113 in response to the Create Default Bearer Request message (407). Since the HeNB 204 includes the SGW function, there is no need to establish a GTP tunnel between the HeNB and the SGW.

Upon receipt of the Create Default Bearer Response message, the MME 113 sends a Bearer Setup Request message including the UL TEID to the HeNB 304 (409). If the Bearer Setup Request message is received, the HeNB 304 checks the TEID and searches for the SGW/PGW UE content. That is, the MME 113 transmits the Bearer Setup Request message along with the TEID such that the HeNB 304 can retrieve the UE context. Next, the HeNB 304 performs an RRC Connection Reconfiguration procedure with the UE 101 (411) and updates the user plane table (412) such that the data received on the radio bearer are routed to the HeNB 304 other than the SGW 105. As a consequence, the HeNB 304 transmits the data received through the radio bearer to the IP network via the PGW implemented in the HeNB 304 with reference to the SGW/PGW UE context retrieved using the TEID. In response to the Bearer Setup Request message, the HeNB 304 sends a Bearer Setup Response message including DL TEID (413). However, since there is no need to establish the GTP tunnel to the SGW 105, the MME 113 does not send any message (e.g. Update Bearer Request message) to the SGW 105.

As a consequence, the HeNB 304 routes the data packet received from the local IP address within the home network but not across the operator's network (i.e. the SGW 105 and PGW 107), and this means that the local data packet transmission is terminated at the HeNB 403. Since the local data routing is terminated at the HeNB, it is possible to reduce the unnecessary traffic load in the operator's network and propagation delay of the local data.

Figure 5:
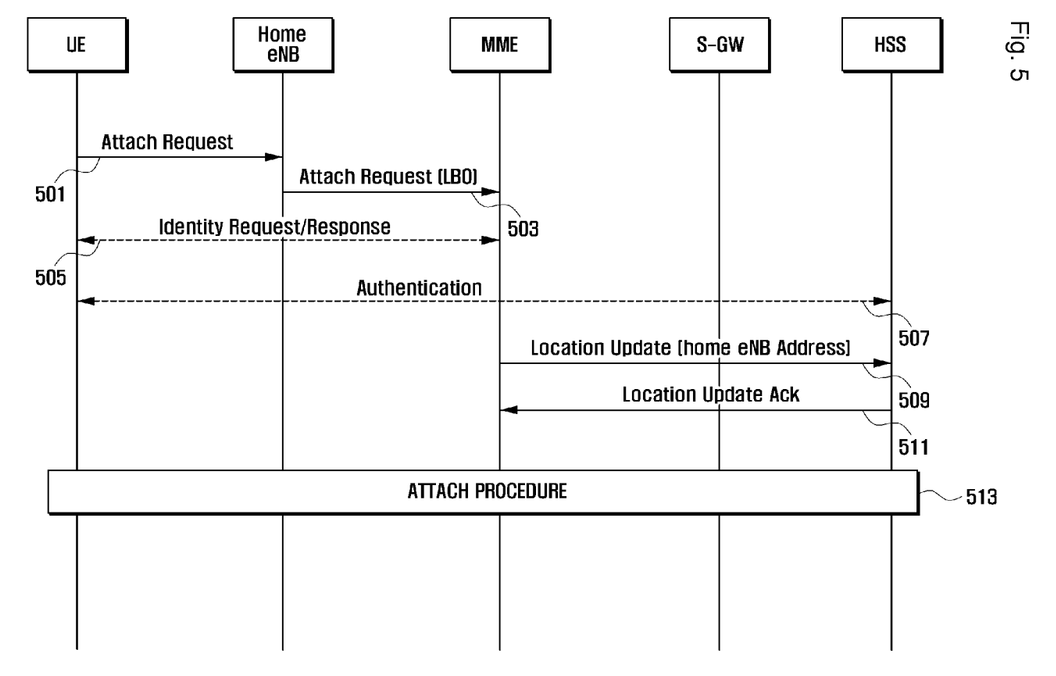
FIG. 5 is a sequence diagram illustrating operations of network entities for a local breakout session establishment method when an UE registers with the network via a HeNB in an LTE system according to an exemplary embodiment of the present invention.

FIG. 5 is a sequence diagram illustrating operations of network entities for a local breakout session establishment method when an UE registers with the network via a HeNB in an LTE system according to an exemplary embodiment of the present invention.

Referring to FIG. 5, first the UE 101 transmits an Attach Request message to the HeNB 304 (501). Upon receipt of the Attach Request message, the HeNB 304 forwards the Attach Request message to the MME 113 (503). At this time, the HeNB 304 inserts a local breakout indicator (LBO) into the Attach Request message. If the Attach Request message is received, the MME 113 checks the identity of the UE 101 (505) and performs authentication on the UE 101 (507). Next, the MME 113 sends a Location Update message to the HSS 117 to inform of the registration of the UE 101. In case that the Attach Request message contains the LBO indicator at step 503, the MME 113 transmits the Location Update message including the address of the HeNB 304.

Upon receipt of the Location Update message, the HSS 117 checks the address of the HeNB contained in the Location Update message, stores the HeNB address in the UE context, and then sends a Location Update Acknowledge message to the MME 113 (511). The HeNB address stored in the HSS 117 is used as the SGW and PGW address when the UE requests a Home Local breakout afterward. In case that the HeNB 304 does not reply to the MME 113 in response to the request for a local breakout session or the HeNB 304 does not support the local breakout, the MME 113 requests the HSS 117 for deleting the HeNB address such that the HSS 117 deletes the HeNB address from the UE context. After transmitting the Location Update Acknowledge message, an Attach procedure is performed between the UE 101 and the HSS 117 (513).

Figure 6:
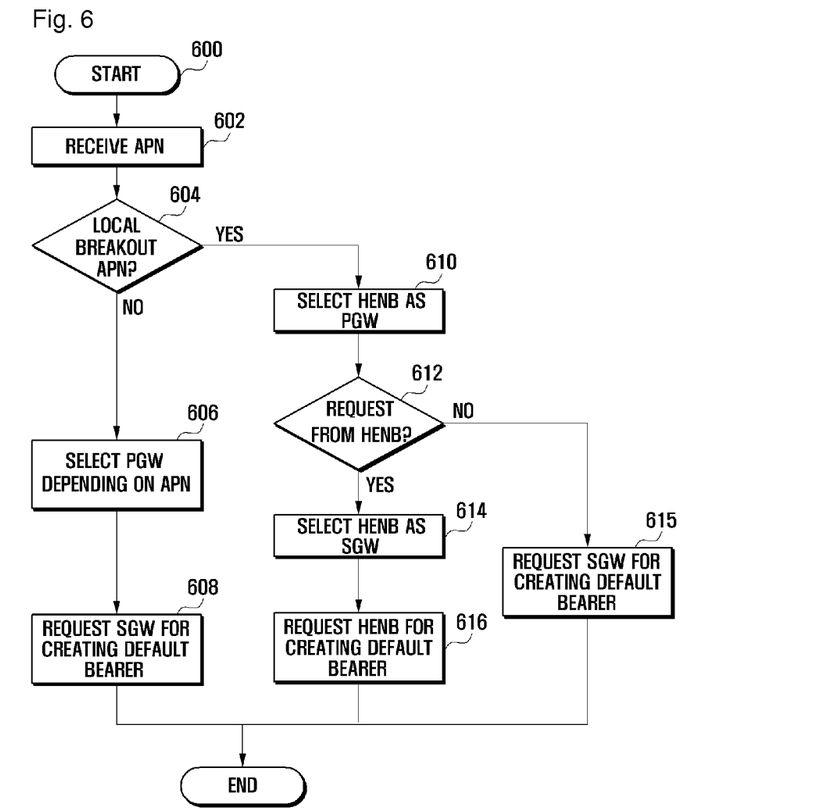
FIG. 6 is a flowchart illustrating operations of the MME in a local breakout session establishment method for an LTE system according to an exemplary embodiment of the present invention

FIG. 6 is a flowchart illustrating operations of the MME in a local breakout session establishment method for an LTE system according to an exemplary embodiment of the present invention.

Referring to FIG. 6, the MME 113 receives an IP address request message transmitted by a UE 101 (602). If an IP address request message is received, the MME 113 checks the APN including in the IP address request message and determines whether the APN is a local breakout APN (604). If the APN is not a local breakout APN, the MME 113 selects a PGW 107 providing PDN service indicated by the APN (606) and transmits a Create Default Bearer Request message to the SGW 105 (608).

Otherwise, if the APN is a local breakout APN at step 604, the MME 113 selects the address of the HeNB 304 as the address of the PGW (610). Next, the MME 113 receives an APN Request message and determines whether the APN request message is received from the HeNB 304 (612). If an APN request message is received from the HeNB 304, the MME 113 selects the HeNB 304 as the SGW (614) and transmits the Create Default Bearer Request message to the HeNB 304 (616). Otherwise, if the APN request message is received from eNB 103, the MME 113 transmits the Create Default Bearer Request message to the SGW 105 (615).

As described above, a local breakout session establishment method and apparatus of the present invention differentiates the local packet data service from the global packet data service and assigns a local IP address to the UE requesting the local packet data service so as to prevent the local data traffic from being routed across the operator s network unnecessarily, resulting in reduction of propagation delay of the local data packets and improvement of entire system throughput.

Also, the local breakout session establishment method and apparatus for an LTE system according to the present invention is capable of providing a local breakout service by allowing the HeNB to route local data packets generated by the UE within the home network under the control of the HeNB other than route across the operator s network, resulting in efficient resource management.

Furthermore, in the local breakout session establishment method and apparatus for an LTE system according to the present invention, the IP address of the UE assigned by different network entities depending on the characteristics of the service requested by the UE, thereby reducing unnecessary signaling traffic. That is, the local breakout session establishment method and apparatus of the present invention allows the HeNB to assign the IP address to the UE requesting a local data service, thereby preventing the signaling for local data service session from being transmitted to the PGW unnecessarily.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A method of providing a local breakout service of a mobility management entity (MME) in a wireless communication system, comprising:
   receiving a connection request message;
   transmitting a location update message including an address of a home evolved Node B (HeNB);
   determining whether local breakout access point name (APN) information is contained in the connection request message;
   selecting a packet data network (PDN) gateway (PGW) corresponding to the HeNB according to the address of the HeNB provided by a home subscriber server (HSS) if the local breakout APN information is contained in the connection request message; and
   transmitting a create default bearer request message to the selected PGW to create a default bearer.

2. The method of claim 1, further comprising:
   receiving a create default bearer response message including an internet protocol (IP) address of a user equipment assigned by the selected PGW, and transmitting a bearer setup request message.

3. The method of claim 2, wherein the create default bearer response message and the bearer setup request message include a tunnel endpoint identifier (TEID).

4. The method of claim 1, further comprising:
   receiving, if an attach request message is received from a user equipment, the attach request message including a local breakout indicator,
   wherein the address of the selected PGW in a user equipment context for use in the local breakout service is stored as a gateway address by the HSS.

5. The method of claim 1, wherein the connection request message is a PDN connectivity request message or an attach request message including the local breakout APN.

6. The method of claim 5, wherein the local breakout APN has a fixed value for all user equipments and predefined between a user equipment and network.

7. The method of claim 6, wherein the local breakout APN is formatted as "local," "local.<mobile network code (MNC)>.<mobile country code(MCC)>," and "<home eNB id>.<MNC>.<national numbering convention(NNC)>," or by inserting a home local breakout flag into the PDN request message, to support HeNB local breakout.

8. A mobility management entity (MME) for providing a local breakout service in a wireless communication system, the MME comprising:
   a transceiver configured to transmit and receive a signal; and
   a controller configured to receive a connection request message, transmit a location update message including an address of a home evolved Node B (HeNB), determine whether local breakout access point name (APN) information is contained in the connection request message, select a packet data network (PDN) gateway (PGW) corresponding to the HeNB according to the address of the HeNB provided by a home subscriber server (HSS) if the local breakout APN information is contained in the connection request message, and transmit a create default bearer request message to the selected PGW to create a default bearer.

9. The MME of claim 8, wherein an address of the selected PGW in a user equipment context for use in local breakout service is stored by the HSS.

10. The MME of claim 8, wherein the controller is configured to receive a create default bearer response message including an internet protocol (IP) address of a user equipment assigned by the selected PGW, and transmit a bearer setup request message.

11. The MME of claim 10, wherein the create default bearer response message and the bearer setup request message include a tunnel endpoint identifier (TEID).

12. The MME of claim 8, wherein the connection request message is a PDN connectivity request message or an attach request message including the local breakout APN.

13. The MME of claim 12, wherein the local breakout APN has a fixed value for all user equipments and predefined between a user equipment and network.

14. The MME of claim 12, wherein the local breakout APN is formatted as "local," "local.<mobile network code (MNC)>.<mobile country code(MCC)>," and "<home eNB id>.<MNC>.<national numbering convention(NCC)>," or by inserting a home local breakout flag into the PDN request message, to support HeNB local breakout.

15. A method of providing a local breakout service of home evolved Node B (HeNB) in a wireless communication system, comprising:
   receiving a create default bearer request message from a mobility management entity (MME) if local breakout access point name (APN) information is contained in a connection request message;
   assigning an internet protocol (IP) address to a user equipment which transmitted the connection request message; and
   configuring a radio bearer with the user equipment and routing data transmitted by the user equipment through the radio bearer to an IP network by means of a packet data network (PDN) gateway (PGW) corresponding to a home evolved Node B (HeNB), selected by the MME, provided by a home subscriber server (HSS), wherein the PGW corresponding to the HeNB is selected according to an address of the HeNB, and wherein the address of the HeNB is included in a location update message which is transmitted from the MME to the HSS.

16. The method of claim 15, further comprising:
transmitting, if an attach request message is received from the user equipment, the attach request message including a local breakout indicator to the MME.

17. The method of claim 15, wherein the connection request message is a PDN connectivity request message or an attach request message including the local breakout APN.

18. The method of claim 17, wherein the local breakout APN has a fixed value for all user equipments and predefined between the user equipment and the network.

19. The method of claim 18, wherein the local breakout APN is formatted as "local," "local.<mobile network code (MNC)>.<mobile country code(MCC)>," and "<home eNB id>.<MNC>.<national numbering convention(NNC)>," or by inserting a home local breakout flag into the PDN request message, to support HeNB local breakout.

20. The method of claim 15, further comprising:
transmitting a create default bearer response to the MME; and
receiving a bearer setup request message from the MME to configure a radio bearer with the user equipment.

21. The method of claim 20, wherein a create default bearer response message and a bearer setup request message include a tunnel endpoint identifier (TEID).

22. A home evolved Node B (HeNB) for providing a local breakout service in a wireless communication system, the HeNB comprising:
a transceiver configured to transmit and receive a signal;
a controller configured to receive a create default bearer request message from a mobility management entity (MME) if local breakout access point name (APN) information is contained in a connection request message, assign an internet protocol (IP) address to a user equipment which transmitted the connection request message, configure a radio bearer with the user equipment, and route data transmitted by the user equipment through the radio bearer to an IP network by means of a packet data network (PDN) gateway (PGW) corresponding to a HeNB, selected by the MME, provided by a home subscriber server (HSS), wherein the PGW corresponding to the HeNB is selected according to an address of the HeNB, and wherein the address of the HeNB is included in a location update message which is transmitted from the MME to the HSS.

23. The HeNB of claim 22, wherein the controller is configured to transmit, if an attach request message is received from the user equipment, the attach request message including a local breakout indicator to the MME.

24. The HeNB of claim 22, wherein the connection request message is a PDN connectivity request message or an attach request message including the local breakout APN.

25. The HeNB of claim 24, wherein the local breakout APN has a fixed value for all user equipments and predefined between the user equipment and the network.

26. The HeNB of claim 25, wherein the local breakout APN is as "local," "local.<mobile network code(MNC)>.<mobile country code(MCC)>," and "<HeNB id>.<MNC>.<national numbering convention(NNC)>," or by inserting a home local breakout flag into the PDN request message, to support HeNB local breakout.

27. The HeNB of claim 22, wherein the controller is configured to transmit a create default bearer response to the MME, and receive a bearer setup request message from the MME to configure a radio bearer with the user equipment.

28. The HeNB of claim 27, wherein a create default bearer response message and a bearer setup request message include a tunnel endpoint identifier (TEID).

* * * * *